Patented Feb. 8, 1927.

1,616,850

UNITED STATES PATENT OFFICE.

LAWRENCE HUGO FLETT, OF HAMBURG, NEW YORK, ASSIGNOR TO NATIONAL ANILINE & CHEMICAL CO., INC., OF NEW YORK, N. Y., A CORPORATION OF NEW YORK.

PRODUCTION OF POLYAZO COLORING MATTERS.

No Drawing.   Application filed April 2, 1926.   Serial No. 99,382.

This invention relates to the production of new polyazo coloring matters which are of value for dyeing animal and other fibres or material. The material dyed, stained or printed with the new coloring matters also forms a part of the present invention.

The new coloring matters can be obtained by coupling three molecular proportions of the same or of different diazotized aromatic amino bodies at least one of which contains an acid group, i. e., a carboxyl or a sulfonic acid group, with one molecular proportion of resorcine which is free from substituents.

The new compounds correspond with the general formula

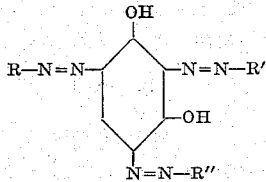

wherein R, R' and R'' represent aromatic hydrocarbon groups or radicals, more particularly of the benzene series, which may contain substituents, and in at least one of said aromatic radicals there is present an acid group, i. e., a carboxyl or a sulfonic acid group.

The new polyazo coloring matters in the dry and pulverized state and in the shape of their alkali metal salts are soluble in water and in general dye animal fibres and other material yellow to orange to brown shades. If desirable, they may be chromed.

The following specific example will further illustrate the invention, but it is understood that the invention is not limited thereto. The parts are by weight.

Example: 39 parts (2 mols) of the sodium salt of sulfanilic acid are dissolved in about 80 parts of water and diazotized in the usual manner by the addition of about 33 parts of 50° Bé. sulfuric acid and 13.8 parts (2 mols) sodium nitrite, and the resulting diazo solution added to 11 parts (1 mol) of resorcino dissolved in about 40 parts of water, the temperature being maintained at 0°–10° C. After stirring about four hours or more, about 10.6 parts of sodium carbonate are slowly added over a period of one-half to one-hour and then 22.7 parts of a 47° Bé. caustic soda solution are added, the solution being cooled to about 0° C. by any suitable means as by addition of ice. To this solution there is then added a diazotized solution of 12.2 parts (1 mol) of commercial xylidine (diazotized in the usual manner at 0° C. by means of about 6.9 parts sodium nitrite and 27 parts of 20° Bé. hydrochloric acid) until a test with R-salt shows the presence of a small excess of diazoxylidine. The alkaline reaction mixture is then neutralized by the addition of hydrochloric acid and the dyestuff salted out by the addition of common salt, filtered off and dried.

The new dyestuff thus obtained corresponds in the free state to the formula

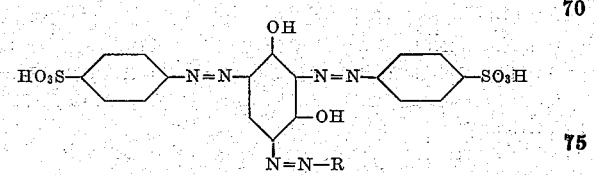

wherein R represents a xylyl radical, and in the dry state in the form of its sodium salt is a powder soluble in water and dyes sumac or chrome mordanted leather excellent brown shades. It also dyes silk and wool. It stains wood chocolate shades.

In the above example, a pure xylidine may be employed instead of a commercial xylidine which comprises a mixture of xylidines.

In an analogous manner, other diazotized aromatic amino or aromatic aminoazo bodies may be employed, and the invention carried out in any usual or suitable way. For example, aniline, naphthylamine, their homologues and their hydroxy, nitro, carboxy, sulfo, amino, and other derivatives, including their aminoazo compounds, may be used.

I claim:

1. As new products, the polyazo coloring matters which correspond with the formula

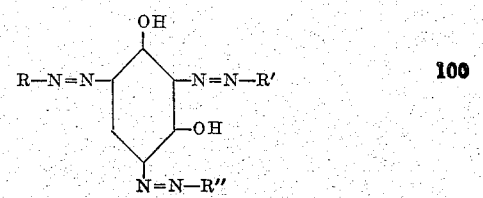

wherein R, R' and R" represent aromatic residues which may contain substituents, there being at least one acid group present as a substituent in at least one of said aromatic residues.

2. As new products, the polyazo coloring matters which correspond with the formula

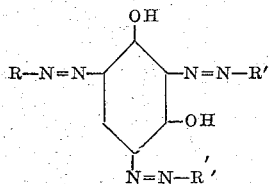

wherein R, R' and R" represent aryl residues of the benzene series which may contain substituents, there being present at least one acid group as a substituent in at least one of said aryl residues.

3. As new products, the polyazo coloring matters which correspond with the formula

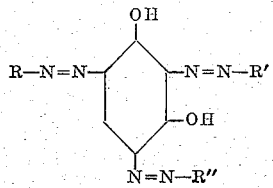

wherein R, R' and R" represent aryl residues which may contain substituents, there being present at least one sulfo group as a substituent in at least one of said aryl residues.

4. As new products, the polyazo coloring matters which correspond with the formula

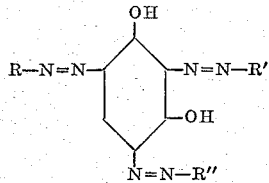

wherein R, R' and R" represent aryl residues which may contain substituents, there being present at least one acid group as a substituent in at least each of two of said aryl residues.

5. As new products, the polyazo coloring matters which correspond with the formula

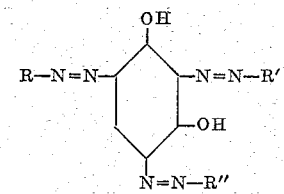

wherein R, R' and R" represent aryl radicals of the benzene series which may contain substituents, there being present at least one sulfo group as a substituent in at least each of two of the said aryl residues.

6. As new products, the polyazo coloring matters which in the free state correspond with the formula

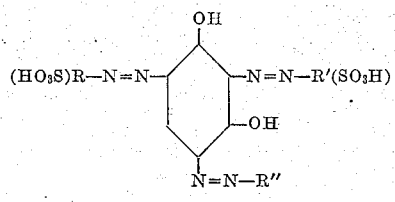

wherein R, R' and R" represent aryl hydrocarbon residues of the benzene series.

7. As a new product, the triazo coloring matter which in the free state corresponds with the formula

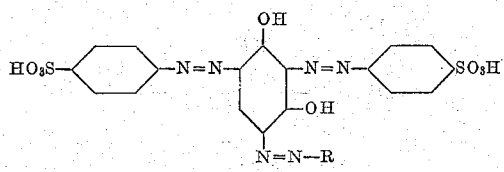

wherein R represents a xylyl radical free from substituents.

8. Material dyed with a coloring matter of claim 1.

9. Material dyed with a coloring matter of claim 2.

10. Material dyed with a coloring matter of claim 3.

11. Material dyed with a coloring matter of claim 4.

12. Material dyed with a coloring matter of claim 5.

13. Material dyed with a coloring matter of claim 6.

14. Material dyed with the coloring matter of claim 7.

In testimony whereof I affix my signature.

LAWRENCE HUGO FLETT.